United States Patent
Arisawa et al.

(10) Patent No.: US 6,751,240 B2
(45) Date of Patent: Jun. 15, 2004

(54) SYSTEMS FOR GENERATING SHORT-PULSE LASER LIGHT

(75) Inventors: Takashi Arisawa, Kyoto (JP); Kyoichi Deki, Kyoto (JP); Fumiaki Matsuoka, Kyoto (JP)

(73) Assignee: Japan Atomic Energy Research Institute, Tokyo (JP)

( * ) Notice: Subject to any disclaimer, the term of this patent is extended or adjusted under 35 U.S.C. 154(b) by 114 days.

(21) Appl. No.: 09/903,732

(22) Filed: Jul. 13, 2001

(65) Prior Publication Data

US 2002/0024986 A1 Feb. 28, 2002

(30) Foreign Application Priority Data

Jul. 14, 2000 (JP) ........................................ 2000-213587

(51) Int. Cl.[7] .............................. H01S 3/30; H01S 3/10
(52) U.S. Cl. ............................. 372/3; 372/21; 372/22; 372/25
(58) Field of Search .............................. 372/3, 21–22, 372/25

(56) References Cited

U.S. PATENT DOCUMENTS

| | | | | | |
|---|---|---|---|---|---|
| 4,618,783 A | * | 10/1986 | Pradere et al. | ................. | 372/3 |
| 4,633,103 A | * | 12/1986 | Hyman et al. | ................. | 372/3 |
| 4,868,833 A | * | 9/1989 | Stultz et al. | .................... | 372/3 |
| 4,933,943 A | * | 6/1990 | Narhi et al. | ..................... | 372/3 |
| 5,260,954 A | * | 11/1993 | Dane et al. | .................... | 372/25 |
| 5,377,211 A | * | 12/1994 | Kong et al. | ..................... | 372/3 |
| 5,648,976 A | * | 7/1997 | Franck et al. | .................. | 372/25 |
| 5,898,714 A | * | 4/1999 | Morita et al. | .................. | 372/25 |
| 6,014,249 A | * | 1/2000 | Fermann et al. | ............... | 372/21 |

* cited by examiner

*Primary Examiner*—Paul Ip
*Assistant Examiner*—James Menefee
(74) *Attorney, Agent, or Firm*—Banner & Witcoff, Ltd.

(57) ABSTRACT

A method for generating ultra-short pulse amplified Raman laser light. Short pulse laser light is amplified, and a portion thereof is introduced into a Raman oscillator to produce compressed laser light. The compressed light is introduced to a first Raman amplifier. The remainder of the short pulse laser light is introduced to a polarizer, and the reflected light is introduced into the first Raman amplifier to pump it. The light transmitted through the first Raman amplifier that has not contributed to pumping is introduced to a beam splitter to produce a second reflected light that is passed to a second Raman amplifier to pump that amplifier. The compressed light is amplified in the first Raman amplifier and introduced to the second Raman amplifier to further amplify it. This further amplified radiation is passed through delay lines to the beam splitter, which passes only first Stokes radiation to generate ultra-short pulse amplified Raman laser light.

1 Claim, 10 Drawing Sheets

Fig. 9
EXPERIMENTAL SYSTEM
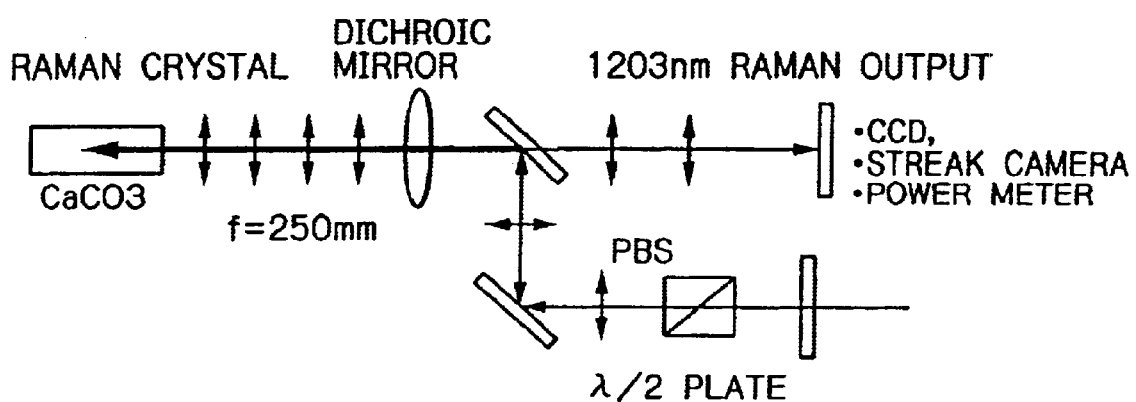
- PUMP LASER PULSE AT 1064nm
- 366ps (FWHM)
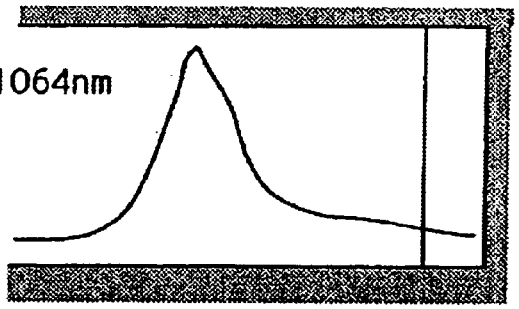
- RAMAN OSCILLATOR AT 1203nm
- 49ps (FWHM)
COMPRESSION : 7.5
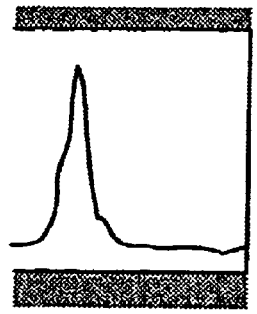

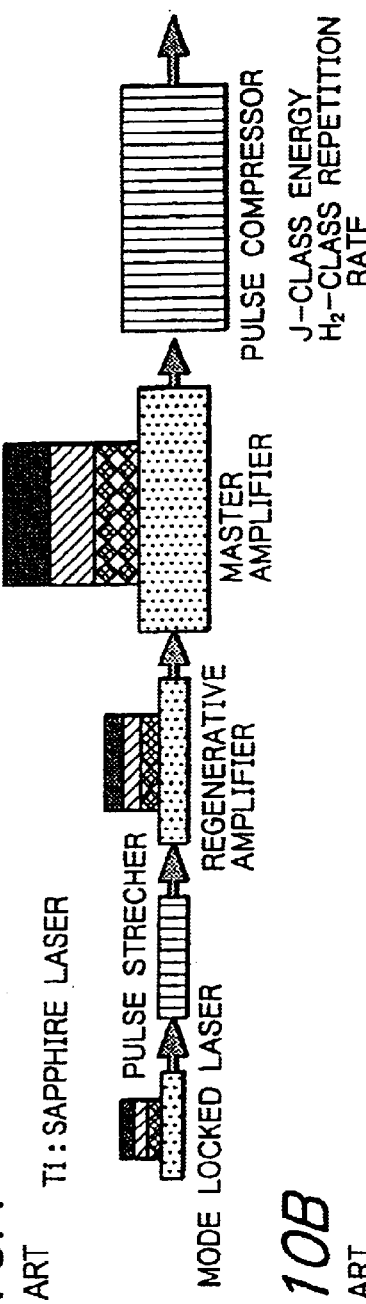
Fig. 10A PRIOR ART Ti:SAPPHIRE LASER
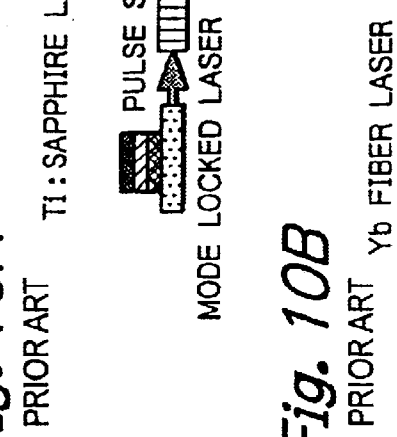
Fig. 10B PRIOR ART Yb FIBER LASER
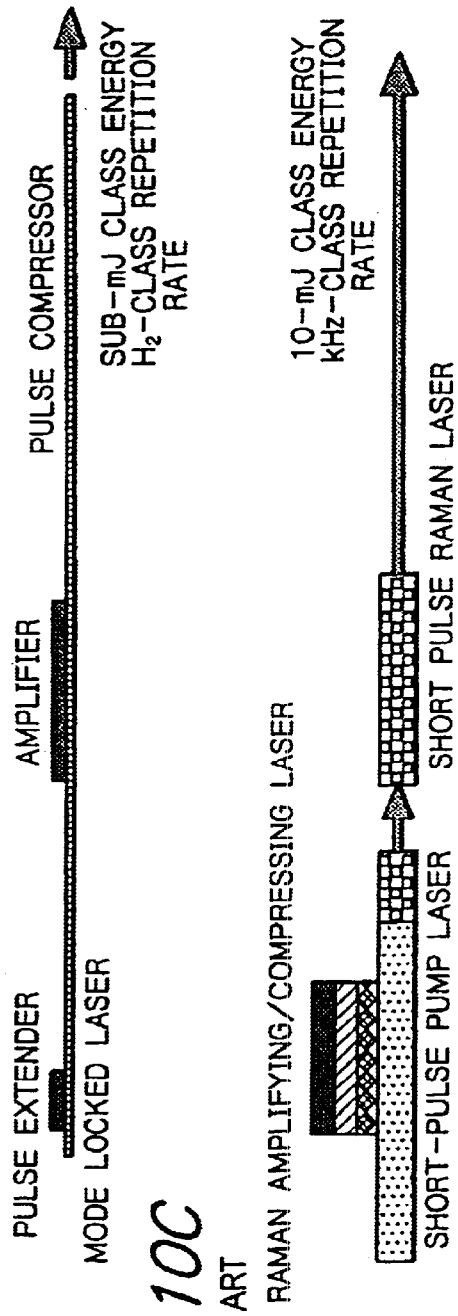
Fig. 10C PRIOR ART RAMAN AMPLIFYING/COMPRESSING LASER

SYSTEMS FOR GENERATING SHORT-PULSE LASER LIGHT

This application is based upon and claims the benefit of priority from Japanese Patent Application No. 213587/2000, filed Jul. 14, 2000, the entire contents of this application are incorporated herein by reference.

BACKGROUND OF THE INVENTION

This invention relates to the fabrication of the lasers described below, as well as their use in various applications including micromachining, analyses by high-intensity short-pulse x-rays and medical diagnoses and treatments.

(1) Fabrication of Industrially Applicable Short-pulse High-peak Power Lasers

Short-pulse high-peak power lasers have a history of more than 10 years on the commercial market and yet they have not been used at industrial sites. FIG. 10A shows a conventional laser system constructed by incorporating a Ti:sapphire laser into the CPA (chirped pulse amplification) technology; as shown, the system consists of a mode-locked laser (and a pump laser), a diffraction grating paired pulse stretcher, a regenerative amplifier (and a pump laser), a master amplifier (and a pump laser), and a diffraction grating paired pulse compressor. The system can produce a peak power as high as several tens of terawatts but the repetition rate is only about 10 Hz. Other disadvantages of the system include bulkiness, high cost, difficult adjustments and low reliability for consistent use over a prolonged period.

FIG. 10B shows a Yb-fiber laser which consists of a fiber mode-locked laser, a fiber pulse stretcher, a fiber amplifier and a fiber pulse compressor. Although this system is compact and has repetition rates on the order of MHz, the limitation of fiber resistance to intense light makes it difficult for the system to output power in excess of mJ per pulse which is a minimum requirement for industrial use.

In order to solve these problems, the present inventors took two approaches. First, in order to shorten the pulse duration, the diffraction grating which was bulky, difficult to adjust and costly was replaced by SBS (stimulated Brillouin scattering) cells (or crystals) and nonlinear Raman crystals; second, the Ti-sapphire crystal was replaced by a Raman cell amplifier to reduce thermal load and enhance reliability.

The new systems are compared with the conventional systems in the following table, in which the problems with the conventional systems are labelled with dots and the features of the new systems with open circles.

TABLE 1

| Function | Design considerations | Advantages (o) and disadvantages (●) |
|---|---|---|
| Amplification | Laser crystal | thermal source lased on quantum efficiency |
|  | Nonlinear crystal | o small thermal load due to negligible heat absorption |
| Production of shorter pulses | Diffraction grating pair | ● suitable for producing ultra-short pulses but the system is bulky and involves difficulty in precise adjustments |
|  | SBS compression |  |
|  | Single | ● SRS occurs and is amplified to increase system instability |
|  | Tandem | o use of materials having different Raman shifts prevents SRS amplification |

TABLE 1-continued

| Function | Design considerations | Advantages (o) and disadvantages (●) |
|---|---|---|
|  | SRS compression |  |
|  | Single | ● high threshold for SRS increases vulnerability to optical damage |
|  | Tandem | o generation of seed light combined with amplifier lowers threshold |
|  | Reflection method |  |
|  | At full waist | o ultra-short pulses are difficult to generate but the system is compact |
|  |  | o high Raman threshold required |
|  | At half waist | o ultra-short pulses are difficult to generate but the system is compact |
|  |  | o low Raman threshold |

(2) Various Uses of the Invention a) non-thermal fine-machining: as a light source for precision machining of semiconductors and marking of electronic-grade glass b) microscopes of exotic function: as a light source for multi-photon microscope c) lithography: as a light source for USLI fabrication d) x-ray fluorescence spectroscopy: enables analysis of elements in ultra-low levels e) high intensity x-ray nondestructive analyzers: as a light source enabling the measurement of low radiation doses f) short-pulse x-ray diffractometer: as a light source for measuring ultra-fast structural changes g) dental x-ray imaging apparatus: as a light source enabling imaging at low radiation dose h) dental scale removers: as a light source for selective removal of scale without adverse effects on the enamel i) high-precision x-ray imaging apparatus: as a light source for projecting high-resolution x-rays j) sterilizing apparatus: as a light source for noninvasive local sterilization k) apparatus for removing or transplanting hair: as a light source for painless surgery l) removal of fouling films, oxide films, plates and paints: no damage to surfaces To produce high-peak power short-pulse laser beams, the following CPA-based methods have been used but they have several problems from a practical viewpoint.

(1) Fiber Chirping Method

In this method, laser oscillation is performed with ordinary lasers and the generated pulses are compressed by eliminating chirping over fibers; the method is implemented by a Nd:YAG laser, Nd:glass laser, Nd:YLF laser, etc. Alternatively, a fiber laser is directly oscillated and the generated pulses are compressed over fibers; this method may be implemented by a Yb fiber laser which employs Yb glass. Whichever method is used, high-intensity light is passed through an extremely thin fiber, so in order to avoid optical damage, the laser power is limited and the pulse energy is no more than about 1 mJ.

(2) Grating Chirping Method
a) Ti:sapphire Laser (see FIG. 10A)

This is a typical CPA-based laser and the technique which uses a pair of diffraction gratings is quite common. However, the diffraction gratings require not only a wide installation space but also precise adjustments, so the technique is too costly to be useful in general industries. In addition, the mode-locked laser as an oscillator and the regenerative amplifier also require precise adjustments. As a further problem, when a high average power is produced, the lasing crystal gives off heat in an amount corresponding to quantum efficiency and the thermal distortion from the heat generated in the crystal must be taken into account.

b) Optical Parametric Short-pulse Laser (OPCPA, or Optical Parametric CPA)

This laser performs amplification based on nonlinear effect, so the thermal load imposed on it is much smaller than what is experienced by the Ti:sapphire laser. However, it still needs a mode-locked laser as an oscillator, a pulse stretcher using a diffraction grating pair, and a pulse compressor. Furthermore, the conditions for optical parametric amplification are so rigorous that efficient light emission is not easy to realize.

To solve these problems, the following techniques are used in the present invention.

(1) In place of the bulky diffraction grating pair, a very small nonlinear crystal is used to compress pulses. In extending and compressing pulses, precise adjustments are necessary but this requires considerable space and adds to the cost. Therefore, to minimize the required space, pulses should be compressed within a very small crystal.

(2) High power far in excess of the limit on fiber output is produced. Use of fibers in place of the diffraction grating pair has been known for years but high power cannot be produced since the passage of light through a thin fiber can cause optical damage. To cope with this problem, the present inventors developed an optical system capable of generating short pulses in high power by making use of the stimulated Raman scattering in crystal.

The Raman compression technology is known but the Raman light to be amplified usually has power with an extremely low noise level, so it has been necessary to use extremely intense pump light but then the threshold for the generation of Raman light is high enough to increase the chance of optical damage. To avoid this problem, particularly in the case of using crystals having high thresholds for the generation of Raman light, the present inventors adopted the half-waist reflection method and the tandem crystal method. In the half-waist reflection method, the crystal is so cut that the emerging laser beam has a half waist at the exit face and the crystal end face is either reflection coated or fitted with a mirror to collect the scattered light, thereby lowering the threshold level. In the tandem crystal method, two crystals are used, one as an oscillator to generate faint Raman light and the other for amplifying it; as the result, the threshold for the generation of Raman light is significantly lowered and, at the same time, the beam fluctuations are minimized by saturation amplification.

(3) High-power short-pulse pump light is produced. To produce short enough pulses by Raman scattering, the development of a short-pulse high-power pump laser is essential. To this end, the present inventors propose a SBS-based short-pulse pump laser system which uses a tandem SBS cell method, or two different SBS cells.

In order to ensure consistent generation of intense short-pulse light from one SBS cell, simultaneously occurring SRS must be prevented from circulating through the system. To meet this need, the generated SBS light is amplified by passage through the other SBS cell. Because the two SBS cells are made of different materials, the SRS generated in the first cell is not amplified in the second cell.

(4) Amplification is not done by the lasing medium but by a Raman crystal having a much smaller thermal load.

The biggest problem with high-power lasers is thermal load. The Ti:sapphire laser and other conventional lasers suffer loss due to quantum efficiency and this loss propagates through the crystal as heat, making it difficult to produce high power. In Raman amplification, short-pulse Raman light can be amplified efficiently without heat generation and hence high-power beams can be produced without deterioration in beam quality.

(5) Non-CPA-based multi-stage compression

In CPA, the pulses generated by the mode-locked laser are first stretched, then amplified and finally compressed. This involves a lot of waste. The system of the invention starts with pulses having a duration of several hundred picoseconds, which is gradually decreased to sub-picoseconds through multiple stages, thereby achieving high efficiency and compactness. In the multi-stage approach, compression can be accomplished to a time range equivalent to the phonon life and the optical characteristics of nonlinear crystals must first be understood thoroughly.

SUMMARY OF THE INVENTION

The present invention has the following objectives.

(1) To realize a compact, high-pulse-energy power and short-pulse laser using an amplification system that is theoretically free from heat generation.

(2) To perform automatic correction of wave planes by generating Raman light in the presence of thermal distortion.

(3) To realize a compact system that can produce shorter pulses without using the pulse extender, pulse compressor and other devices used in CPA that are bulky and which require precise adjustments.

To attain these objects, the present inventors developed the following techniques.

a) Compressing sub-nanosecond laser pulses by the tandem SBS method using the stimulated Brillouin scattering effect.

b) Multi-stage compression of pulses to a duration as short as the phonon life (sub-picoseconds) using the stimulated Raman scattering effect.

c) Introducing seed pulses by the half-waist reflection method and the tandem crystal method for the purpose of reducing the simulated Raman scattering effect.

The development of these techniques requires optical data for nonlinear crystals but none of them have been available. Hence, the present inventors found by experiment the limit on optical damage and the threshold intensity of the pump laser for the generation of optical scattering in a laser field that was intense but not so strong as to cause channeling due to self-focusing.

Thus, the present invention provides a short-pulse pump laser light generator consisting essentially of:

1) a solid laser pumping mechanism which does not use lossy fibers but which forms parallel beams from a semiconductor laser by means of a cylindrical telescope consisting of cylindrical lenses and reshaping prism optics comprising combined prisms, with the parallel beams being condensed with a collimator lens to produce high-intensity light that can pump the active medium in the solid laser;

2) a pumped laser light oscillator incorporating said mechanism 1);

3) a laser light amplifier incorporating said mechanism 1); and
4) a SBS pulse compressor which comprises condensing optical element cells made of two different materials and which generates short-pulse laser light by the stimulated Brillouin scattering (SBS) effect.

In the generator, the pumped laser light from the oscillator is introduced into a preamplifier and amplified; the amplified light is introduced into the SBS pulse compressor and the resulting short-pulse laser light is introduced into the same preamplifier and amplified; the amplified laser light is introduced into another preamplifier, amplified and further amplified in a master amplifier, thereby producing amplified laser light having a shorter pulse duration.

The present invention also provides an ultra-short pulse amplified laser light generator consisting essentially of:
a) a mechanism for producing ultra-short pulse amplified laser light in which the short-pulse pump laser light generated by the apparatus described above is condensed by condensing optics, introduced into a Raman crystal and reflected with a reflector back into the Raman crystal to form phonon lattices;
b) a Raman light oscillator incorporating said mechanism a);
c) a laser light amplifier/compressor incorporating said mechanism a).

In this generator, the short-pulse pump laser light is supplied into the pump laser light amplifier and amplified; then, the Raman oscillator is pumped and the emitted light is introduced into the Raman amplifier, amplified and supplied into another Raman amplifier pumped with first Stokes radiation; the light is amplified in the second Raman amplifier, from which it is output as ultra-short pulse amplified Raman laser light.

The invention also provides:
d) an apparatus that incorporates the generator and which not only generates harmonics but also outputs compressed pulses.

BRIEF DESCRIPTION OF THE DRAWINGS

FIG. 9 shows the duration of pulses in the ultra-short pulse amplified laser light obtained by the invention; and FIGS. 10A–10C show three conventional mechanisms for generating high-power short-pulse laser light.

DETAILED DESCRIPTION OF THE INVENTION

The stated objects of the invention can be attained by the following specific means which should be taken as just one example of the way to realize the operating principles of the invention.

(1) Generating Short-pulse Pump Laser Light

Figure 1:
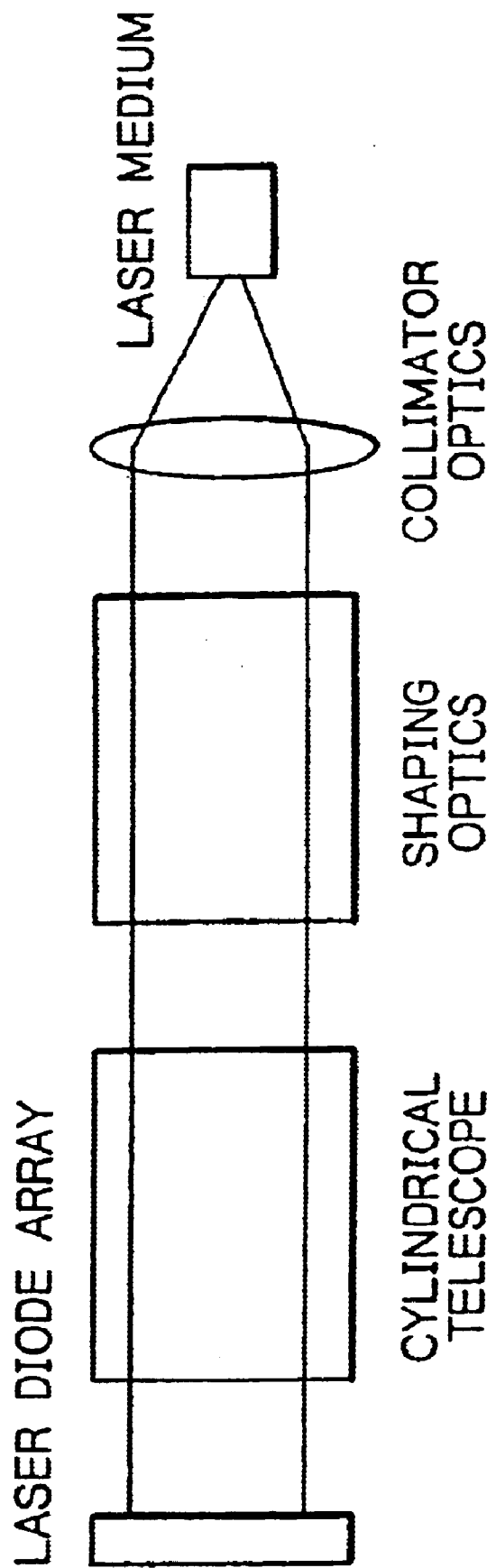
FIG. 1 shows a laser medium pumping mechanism used in the invention.

For fabricating a compact apparatus, semiconductor laser light has to be condensed so that a solid laser can be pumped with high-intensity light having as uniform distribution as possible. This requires a system for condensing light from a semiconductor laser array that oscillates from a wide area and which has different beam spreads in a longitudinal and a transverse direction. An example of this system is shown in FIG. 1; the light from a semiconductor laser array is converted to parallel beams by passage through a cylindrical telescope consisting of concave and convex cylindrical lenses and reshaping optics comprising a prism array, and the parallel beams are passed through a conventional collimator lens so that it is condensed to high enough intensity to pump a solid laser medium (Nd:YAG). The system differs from the conventional end pumping system in that it is capable of direct pumping without using fibers.

The system is used to fabricate an oscillator and an amplifier (see FIG. 2) which can each perform axial pumping. Compared to the conventional transverse pumping system, the oscillator and amplifier shown in FIG. 2 can emit laser beams of better quality. The improved system arrangement is such that the semiconductor pumping light will not block the optical axis of the solid laser. The system is compact and yet the solid laser emits high-quality beams. The oscillator has a supersaturation absorber to produce shorter pulses.

Figure 2:
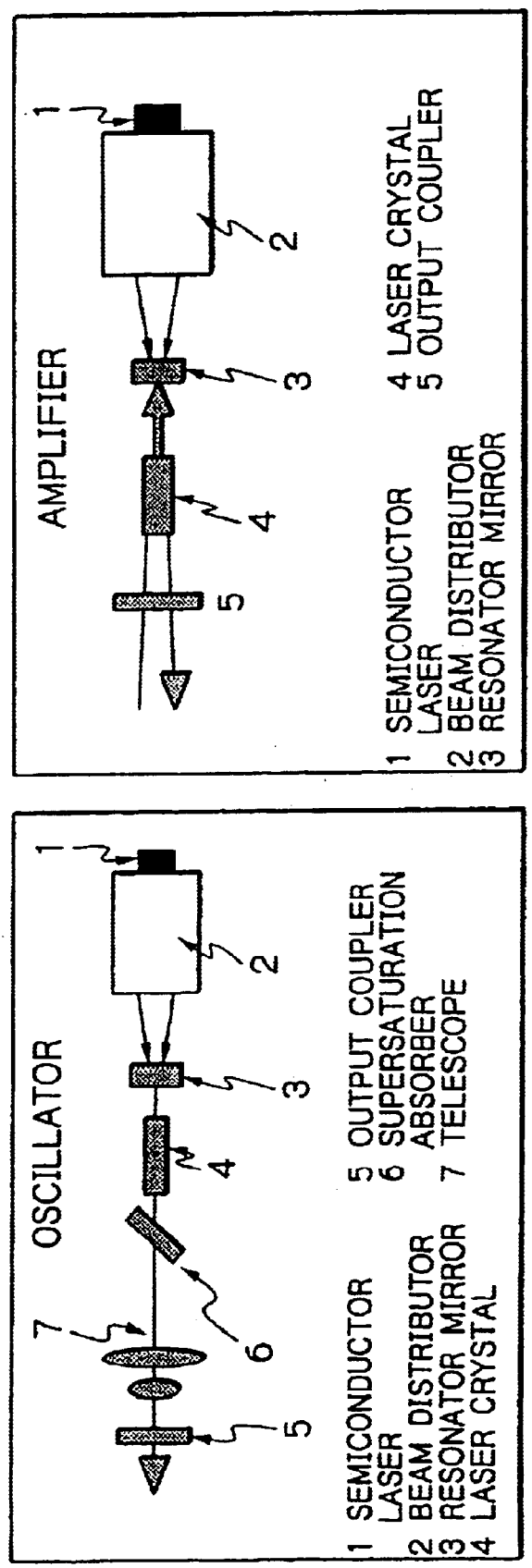
FIG. 2 shows an oscillator and an amplifier that are used in the invention and which each have the laser medium pumping mechanism.

In each of the oscillator and amplifier that are shown in FIG. 2, the light from a semiconductor laser 1 is condensed by a beam distributor 2 consisting of the above-mentioned telescope and shaping optics; the condensed light passes through a resonator mirror 3 to be introduced into a laser crystal 4; by this compact system, solid laser beams of high quality are obtained from an output coupler 5. In the oscillator, a saturable absorber 6 and a telescope 7 are provided between the laser crystal 4 and the output coupler 5.

Figure 3:
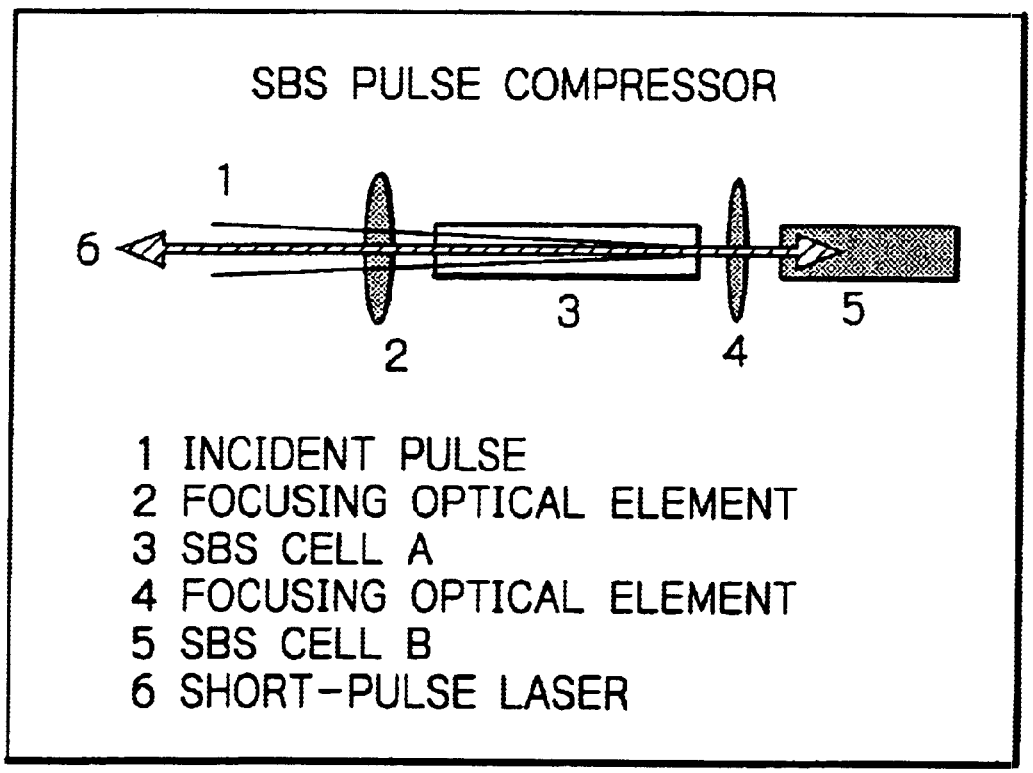
FIG. 3 shows a SBS pulse compressor used in the invention.

The SBS-based short pulse generator (SBS pulse compressor) consists of two SBS cells. As FIG. 3 shows, laser light is condensed by the cell located at the farthest end to generate a diffraction grating for producing shorter pulses. Another cell is located ahead of the first cell to ensure that the light reflected from the first cell collects and compresses later coming laser light. The two cells are made of different materials (e.g. $SnCl_4$ and $TiCl_4$) that have different Raman shifts to ensure that the SRS light generated in the first (farthest) cell will not be amplified in the second cell in an intense optical field to cause system instability.

In the SBS pulse compressor shown in FIG. 3, an incident pulse 1 passes through a condensing optical element 2, SBS cell (A) 3 and a condensing optical element 4 to be condensed by SBS cell (B) 5 and the light reflected from the SBS cell (B) 5 compresses later coming laser light in the cell 3, thereby producing short-pulse laser light 6.

Figure 4:
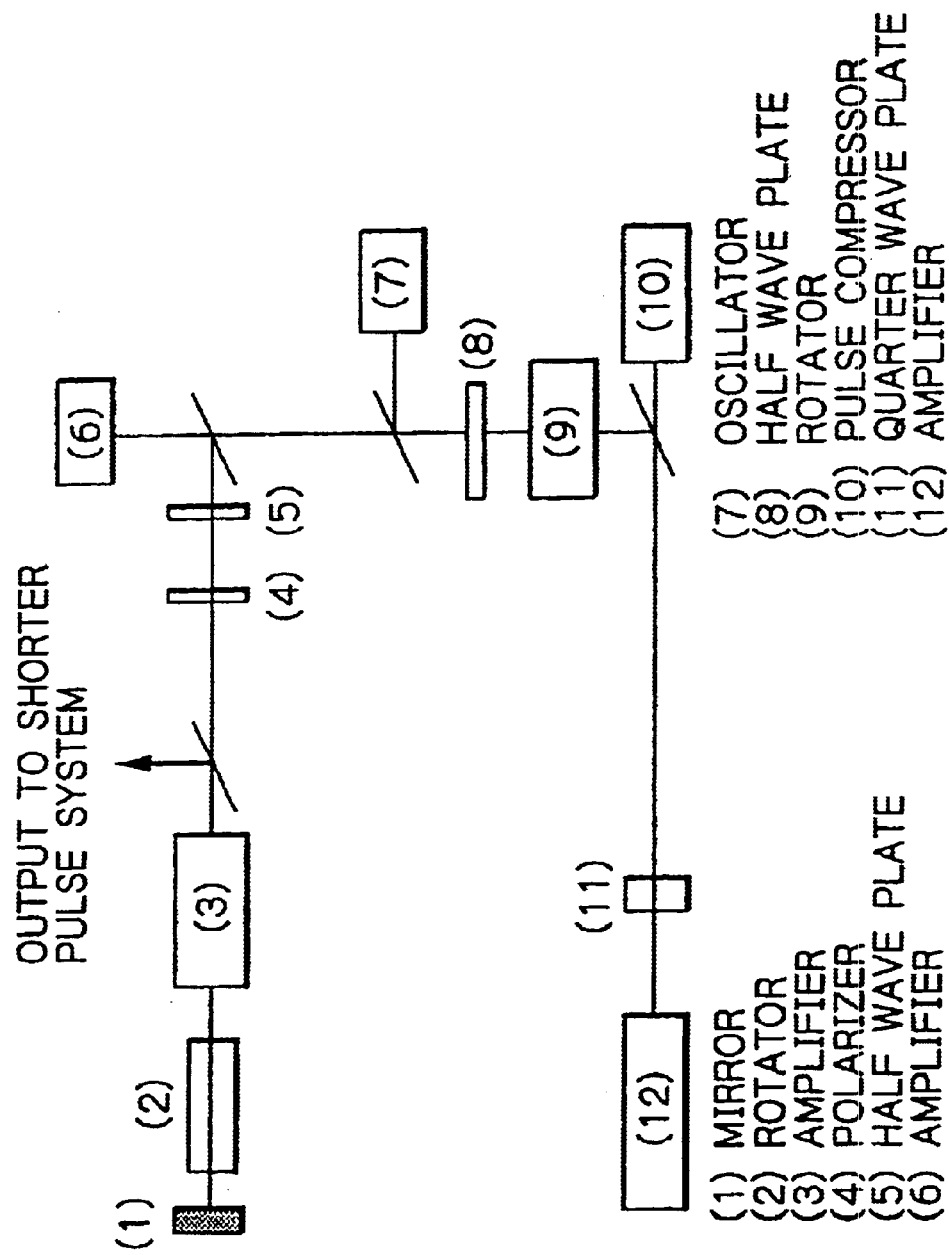
FIG. 4 shows an example of a short-pulse pump laser light generator that incorporates the pumping mechanism, oscillator and amplifier of the invention.

The elements described above (including the oscillator, amplifier and SBS pulse compressor) are assembled to fabricate a short-pulse optical system of the type shown in FIG. 4 as an example. For efficient energy extraction, the system has additional amplifier elements that permit adequate saturation of energy. The output light (short-pulse pump laser light) is used to pump the Raman amplifier/compressor system.

The elements of the system shown in FIG. 4 are described below in detail. A semiconductor laser pumpable all-solid laser oscillator (7) has a saturable absorber and, upon pumping with a semiconductor laser, emits laser light 1 comprising pulses with a duration of a few nanoseconds. The laser light is reflected by a beam splitter (13) as indicated by 2 and enters a preamplifier (12) as indicated by 3. The amplified light 4 enters the SBS pulse compressor (10) as indicated by 5 and shortened pulses are reflected as indicated by 6. The shorter-pulse light reenters the preamplifier (12) as indicated by 3 and the amplified light 4 is reflected by a beam splitter (14) as indicated by 7, whereupon the pulse duration becomes on the order of sub-nanoseconds as indicated by 8. The shorter-pulse light enters a preamplifier (6) where it is amplified as indicated by 9; the amplified light is reflected by a beam splitter (15) and further amplified as indicated by 10. The light then enters a master amplifier (3) to be amplified as indicated by 11 and the amplified light is reflected from a mirror (1) as indicated by 12; the reflected light makes a second passage through the master amplifier (3) as indicated by 13 and short-pulse pump laser light having a pulse duration of sub-nanoseconds (several hundred picoseconds) is picked up from a beam splitter (16) as indicated by 14.

(2) Generating Ultra-short Pulse Amplified Laser Light with Raman Amplifier/Compressor Most importantly, the threshold for SRS has to be obtained without crystal loss. In addition, the diameter of the beam waist at the reflecting face of the crystal must be adequately small. It is also required that the diffraction length of the beam waist at the reflecting face of the crystal in the Raman oscillator be no more than one half the propagation distance of pulse width. Only when these conditions are met can interaction occur between the incident laser light and the forward moving diffraction grating induced in the crystal so that the backward scattered Stokes radiation is effectively amplified and compressed. The seed of the backward scattered Stokes radiation is seeded by the backward scattered Stokes radiation generated by the beams reflected from a reflector mirror provided at the terminal end of the Raman amplifier.

Figure 5:
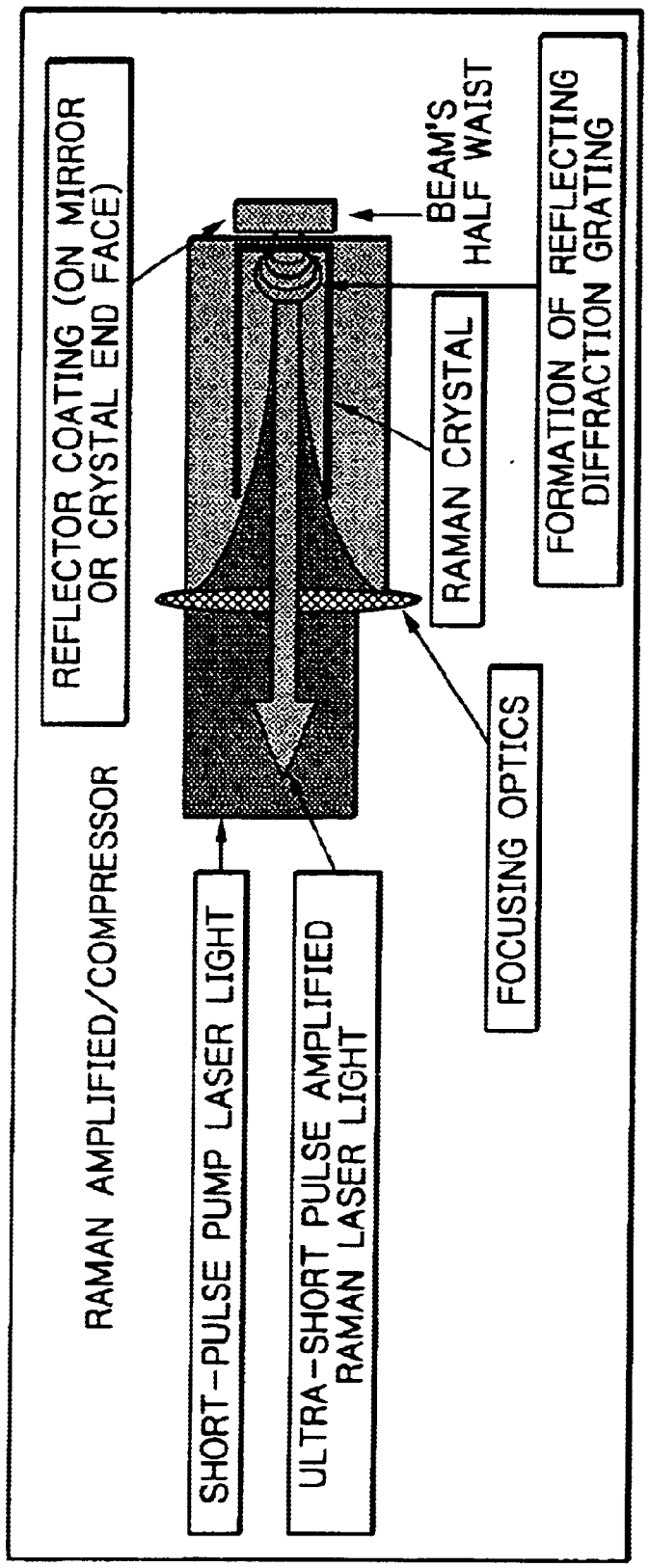
FIG. 5 shows a Raman amplifier/compressor used in the invention.

The Raman oscillator (Raman amplifier/compressor) is specifically shown in FIG. 5; the short-pulse pump laser light generated by the system described in the foregoing section (1) is condensed by condensing optics, introduced into a Raman crystal, reflected by a reflector, makes second entrance into the crystal and forms a reflecting diffraction grating; thereafter, ultra-short pulse amplified Raman laser light is picked up.

The most important design consideration here is how to lower the threshold for SRS. It is easy to generate forward scattered Raman light using $CaCO_3$, $LiNbO_3$ or $KGdWO_4$ as the SRS crystal but if one wants backward scattering, care must be taken not to cause crystal damage.

The best way to deal with this problem is using the Raman seed in an auxiliary crystal. Unlike in the usual case of Raman light generation, SRS need not be started from spontaneous noise, so gains as high as about 50–60 can be obtained. In this way, the threshold for SRS can be significantly lowered compared to the value for ordinary Raman light. Specifically, two crystals are used for exciting SRS; in the first crystal, forward scattered SRS is excited and this is used as a seed for exciting backward scattered SRS in the second crystal.

Optical damage is prevented by using a system in which the short-pulse light generated in the Raman oscillator is amplified through more than one stage of Raman amplifier. The Stokes radiation from the Raman oscillator that has undergone a Stokes shift passes through the first crystal and pumps the Raman crystal at the second stage.

We now describe the system of compressing and amplifying Raman light using the Stokes radiation in the combination of the Raman oscillator and two amplifiers. Short-pulse pump laser light having a pulse width of sub-nanoseconds (several hundred picoseconds) has the wavelength of the fundamental wave in solid laser light and it is introduced into the Raman amplifier/compressor consisting of crystals so as to perform simultaneous pulse compression and amplification. Needless to say, second and third harmonics of the fundamental wave can be used as pump laser light.

Figure 6:
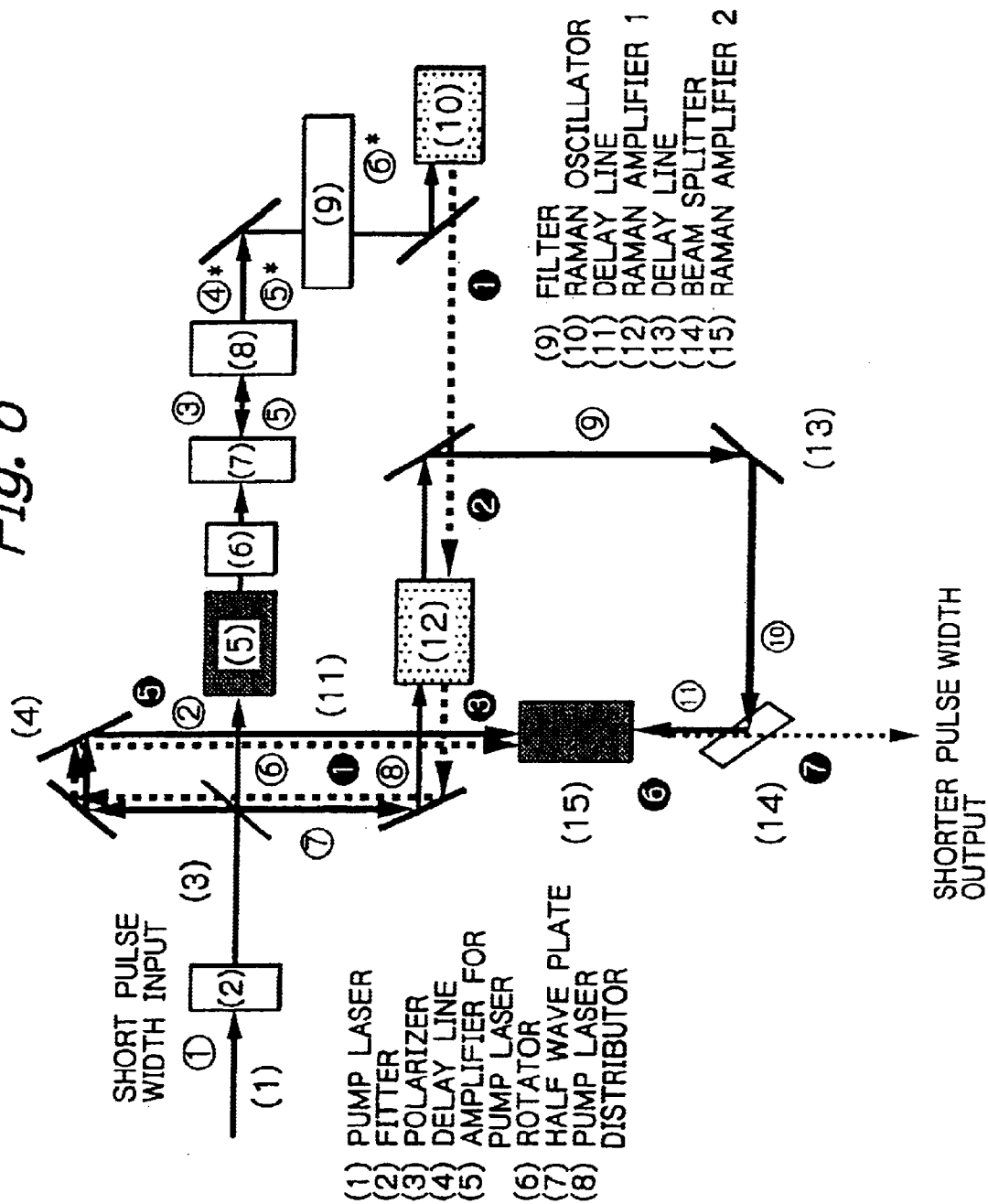
FIG. 6 shows an example of an apparatus that uses the Raman amplifier/compressor to generate high-pulse-energy-power short-pulse laser light from the short-pulse pump laser light.

As shown in FIG. 6, the short-pulse pump laser light indicated by 1 is launched into a pump laser light amplifier (5) as indicated by 2, amplified as indicated by 3 and partly reflected by a pump light distributor (8). The transmitted light 4 is polarized horizontally as indicated by 5 and pumps a Raman oscillator (10) as indicated by 6. The light from the Raman oscillator (10) has a pulse duration of 20 ps which is less than a tenth of the value for the initial pump light and the thus compressed light travels toward the first Raman amplifier (12).

The reflected light from the pump light distributor (8) travels backward as indicated by 5 and is reflected from a beam splitter (3) as indicated by 7 to pump a Raman amplifier (12) as indicated by 8. The light that has not contributed to pumping passes through the Raman amplifier (12) and travels toward a beam splitter (dichroic mirror) (14) as indicated by 10. The beam splitter (14) transmits only the first Stokes radiation. The non-contributory light is reflected by the beam splitter (14) to pump the second Raman amplifier (15) as indicated by 11.

The first Stokes radiation from the oscillator is amplified by the first Raman amplifier (12) and, with time delay being taken into account, enters the second Raman amplifier (15) for further amplification. The amplified light passes through the beam splitter (dichroic mirror) (14) which transmits only the first Stokes radiation and ultra-short pulse amplified Raman laser light is output. The output light is fed into the second-stage Raman compressor and undergoes similar processes of compression to have a pulse duration as short as sub-picoseconds.

The following examples are provided for the purpose of further illustrating the invention but are in no way to be taken as limiting.

EXAMPLE 1

Acquisition of Optical Data for the Compression of SBS Pulses

Figure 7:
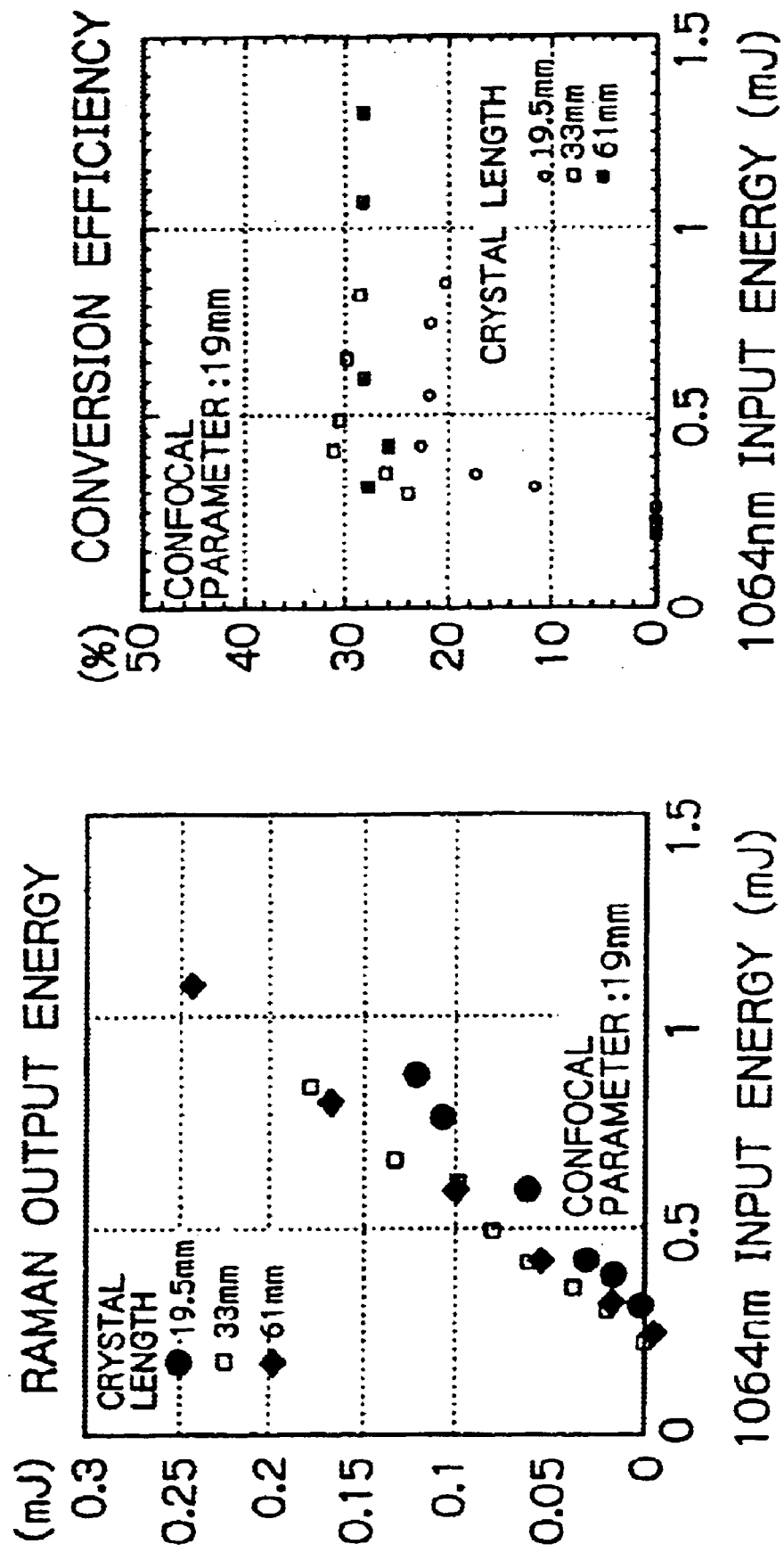
FIG. 7 shows Raman output energy and conversion efficiency as a function of 1064 nm input energy with several crystal lengths.

SBS compression was performed with two cells used to prevent SRS. The gain of two passes as calculated from the amplification characteristics for two passes was 2.3. As shown in the graph on the right side of FIG. 7, the pulse duration as obtained when the condensing optics in the above-described pump laser configuration had a focal length of f-15 mm was 320 ps in terms of FWHM.

EXAMPLE 2

Acquisition of Optical Data for Raman Amplification and Compression

Figure 8:
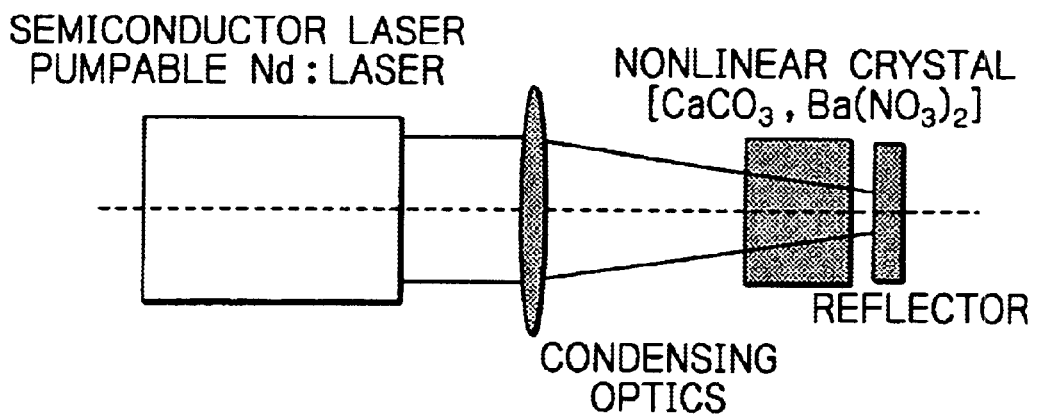
FIG. 8 shows a mechanism for obtaining optical data on Raman amplification and compression using a semiconductor laser pumped Nd:YAG laser.

The threshold for SRS with $Ba(NO_3)_2$ was measured by the beam waist reflection method using a setup of the layout shown in FIG. 8, with a mirror placed at the half beam waist.

With varying values of excitation intensity, gain g was determined to be g~10 cm/GW with crystal length of 300 mm. Based on this data, compressing pump pulses of about 100 ps was assumed and the laser beam was so issued as to have a half waist at the reflecting face (exit end) of the crystal. Channeling due to self-focusing might damage the reflective coating at the exit face of the crystal and the expected intensity of the damage is about 2–2.5 GW/cm$^2$ for the given value of pulse duration.

Optical design must therefore be made to provide values not exceeding the calculated damage intensity. The threshold for SRS with Ba(NO$_3$)$_2$ given such design values was about 30 kW. The multiplication factor was M~40. The cross-sectional area of the laser beam at the reflecting face must be greater than 12.7×10$^{-6}$ cm$^2$ (SRS threshold divided by damage intensity). Given this cross section, the diffraction length is 4 mm. Therefore, the crystal length must be greater than 20 mm by taking the pulse width into consideration. The compression ratio is about 5 to the extent that no optical damage occurs.

The same calculations were made for CaCO$_3$; the diffraction length was ~2.5 cm which was one half the crystal length (5 cm). The threshold for SRS as determined by the experiment was about 200 kW. The damage intensity was about 15 times as high as that of Ba(NO$_3$)$_2$ but its threshold-power was one sixth. Therefore, given pump pulses of about 100 ps, the minimum beam diameter at the exit face of the crystal was 25 mm. Given a beam diameter ~1.6 mm, the pulse compression ratio is 10–12.5.

When KGdWO$_4$ was pumped as the SRS crystal with 25 ps pulses, the occurrence of forward SRS was readily observed at a gain of 4 cm/GW.

Data for the compression of initial 3 ns laser pulses through two stages are shown in Table 2.

TABLE 2

| Compression stage | Medium | Wavelength of pump light (nm) | Wavelength of Raman light (nm) | Threshold energy for Raman generation (mJ) | Pulse duration (ps) | Beam diameter to focal length ratio |
|---|---|---|---|---|---|---|
| First (SBS) | SnCl$_4$ | 1064 | 1108 | 1 | 320 | 1:20 |
| Second (SRS) | Ba(NO$_3$)$_2$ | 1108 | 1254 | 0.16 | 20 | 1:20 |

EXAMPLE 3

Producing Shorter Pulses with Laser System

In a semiconductor pumped by all-solid Nd:YAG laser oscillator, a Cr:YAG crystal was inserted as a supersaturation absorber and by pumping with a 100 W, 300 μs semiconductor laser, 600 μJ laser light was produced as a sequence of 3 ns pulses. This light was amplified with a first preamplifier and compressed to a pulse duration of about 0.3 ns in a SBS pulse compressor. The compressed pulses were fed into the first preamplifier and amplified to an energy of 1.5 mJ in the form of 0.35 ns pulses. The light was further amplified in a second preamplifier to a pulse energy of 6 mJ in the form of 0.32 ns pulses. Finally, the light was subjected to 4-pass amplification in a master amplifier which was a 1200 W semiconductor laser (120 A, 300 μs, 100 Hz), thereby producing 32 mJ short-pulse pump light having a pulse duration of 0.3 ns.

The short-pulse pump laser light (λ=1061 nm) was introduced into a Raman amplifier/compressor comprising a CaCO$_3$ crystal. Fifty-five percent of the short-pulse pump light was reflected by a beam splitter. The transmitted light pumped the Raman oscillator to generate the first Stokes radiation having a pulse duration of 20 ps and a power of 0.2 mJ (see FIG. 9). The pulses in the incident pump light had been compressed to about one-fifteenth the initial duration. The Stokes radiation (1203 nm) was amplified to 2 mJ by the first Raman amplifier and further amplified to 7.8 mJ by the second Raman amplifier. The thus amplified light was output after passage through the dichroic mirror that transmitted only the first Stokes radiation. Eventually, the first-stage compression yielded an energy of 7.8 mJ in an efficiency of about 45%. A minimum pulse duration was 6.8 ps. The output light is supplied into the second-stage Raman compressor where it is subjected to the same compression process to have the pulse duration shortened to sub-picoseconds.

The present invention has the following advantages.
(1) Fabrication of Industrial Compact Short-pulse, Short-wavelength Lasers As mentioned in the introductory part of the specification, there is a strong demand for the use of short-pulse high-peak power lasers. The laser system using the nonlinear effect described herein contributes compactness and long-term reliability.

In order to make the apparatus of the invention into a compact, high-quality short-pulse laser, the already developed ring amplifying solid laser (patent pending) may be used as an amplifier to amplify the light from a SBS pulse compressing oscillator, with the amplified light being then introduced into a Raman amplifying and compressing system.

Taking advantage of high peak power, the apparatus of the invention can generate high-intensity, short-pulse high frequencies and x-rays, so it can provide novel light sources.
(2) Uses of the Invention
1) Industrial Applications using the Fundamental Wave The potential use is as light sources in machining and for multi-photon microscopes.
a. light sources in thermal fine-line machining: The high-quality, mJ-class, high repetition rate and picosecond-class short-pulse laser can condense light of more than 10$^{12}$ watts per square centimeter, making it possible to perform machining without thermal effects on the surrounding area. This presents a particularly important technology for micromachining in the semiconductor industry. It also makes great contribution to the glass marking technology being practiced in the semiconductor industry, liquid-crystal industry and plasma display industry. Particularly great benefit is offered to the machining of electronic-grade glass since precision machining can be accomplished using the self-focusing effect of ultra-high power laser light in glass. In the Raman laser, a wavelength suitable for machining can be chosen by varying the amount of Raman shift with the type of Raman crystal or by shortening the wavelength via high frequencies.
b. light sources for multi-photon microscopes: High peak power is greatly beneficial to the multi-photon effect, so the apparatus can be used as a light source for the multi-photon microscope that can examine atoms and molecules in a particular state.
c. removal of corrosive films, oxide films, plates, radioactive fouling films, fouling films on the surfaces of objects of art, paint, etc. from surfaces using the ability of the high-peak power laser to remove surface contaminants: Removal can be done without damaging the surfaces.

2) Industrial Applications
a. light sources for lithography: Stable uv laser beams are used as a lithographic light source in the fabrication of semiconductor lasers. Excimer lasers are currently used. These gas lasers have to be improved in several points including the use of toxic gases and low reliability. The short-wavelength laser light has high intensity, so by using a nonlinear crystal, high nonlinear effect can be induced to generate stable uv light in high efficiency.

3) Industrial Applications using X-rays

When matter is turned into a plasma by irradiation with the high-peak power laser light, plasma x-rays are generated. If the inner shell around an atom is excited, emission-line x-rays are generated. These x-rays find utility in the following technologies.
a. x-ray fluorescence spectroscopy: Compared to the conventional method of generating x-rays by electron-beam bombardment, the high-peak power laser light produces x-rays of sufficiently high intensity to permit analysis of elements in ultra-low levels.
b. x-ray nondestructive analyzers: Compared to the conventional x-ray tube, the high-peak power laser light produces small enough spot diameters to permit analysis at high resolution.
c. x-ray diffractometer: Analyses that have been only possible with synchrotron radiation can be performed with a very small device.

4) Medical Applications

Advances in laser-based technology contribute not only to noninvasive diagnosis and treatment but also to painless treatment taking advantage of the shortness of pulses.
a. dental x-ray imaging: In the conventional dental x-ray imaging, an external x-ray source is used and this increases the imaging time and the dose of exposure. In addition, low resolution gives considerable difficulty in having correct check of the progress of root surface caries. The short-pulse laser light can be used as an x-ray source capable of overcoming these difficulties.
b. removal of dental scale: The scale deposited on the enamel of the teeth can be removed by ablation as it is automatically distinguished from the enamel.
c. high-precision x-ray imaging: X-rays can be generated from a focused pin point, so the motions of capillary vessels and other tissues can be imaged in high spatial resolution.
d. sterilization: Dermatophytes such as Trichopyton and Epidermophyton can be removed by application of the short-pulse laser or metal applied to the skin can be sterilized by x-rays upon exposure to the short-pulse laser.
e. hair removal and transplantation: Laser depilation is currently practiced but the short-pulse laser allows for completely painless depilation. A new use of this laser is in hair transplantation; holes are made in the skin painlessly and the root of hair is transplanted into the holes.
f. removal of the horny layer: Pock marks on the face can be removed for cosmetic purposes.
g. removal of surface contaminants: The surfaces of articles covered with contaminants, plates and paint films can be selectively cleaned off.

What is claimed is:

1. A method for generating ultra-short pulse amplified Raman Laser light comprising:
   (a) a first step of launching a short-pulse pump laser light into a pump laser light amplifier to form an amplified short-pulse pump laser light,
   introducing the amplified laser light into a pump light distributor to form partly reflected amplified laser light and transmitted laser light,
   introducing the transmitted laser light into a Raman oscillator, and
   shortening a pulse duration of the laser light in the Raman oscillator to form a compressed laser light;
   (b) a second step of introducing the reflected laser light from the pump light distributor onto a polarizer to reflect it thereon,
   introducing the reflected laser light from the polarizer into a first Raman amplifier to pump the amplifier,
   introducing the laser light transmitted through the first Raman amplifier that has not contributed to pumping onto a beam splitter to form a third reflected laser light, and
   introducing the third reflected laser light into a second Raman amplifier to pump the second amplifier; and
   (c) a third step of introducing the compressed laser light of step (a) to the first Raman amplifier to amplify it,
   introducing the amplified radiation from the first Raman amplifier to the second Raman amplifier to further amplify it,
   introducing the further amplified radiation through delay lines to the beam splitter which transmits only first Stokes radiation to generate ultra-short pulse amplifier Raman laser light.

\* \* \* \* \*